US012266466B2

(12) United States Patent
Ohi et al.

(10) Patent No.: US 12,266,466 B2
(45) Date of Patent: Apr. 1, 2025

(54) COIL DEVICE, PULSE TRANSFORMER, AND ELECTRONIC COMPONENT

(71) Applicant: TDK CORPORATION, Tokyo (JP)

(72) Inventors: Kouyu Ohi, Tsuruoka (JP); Tasuku Mikogami, Tokyo (JP); Shuhei Someya, Tokyo (JP); Yusuke Kimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 131 days.

(21) Appl. No.: 18/071,098

(22) Filed: Nov. 29, 2022

(65) Prior Publication Data

US 2023/0093320 A1 Mar. 23, 2023

Related U.S. Application Data

(63) Continuation of application No. 16/577,286, filed on Sep. 20, 2019, now Pat. No. 11,545,294.

(30) Foreign Application Priority Data

Oct. 5, 2018 (JP) ................................ 2018-190333

(51) Int. Cl.
*H01F 27/29* (2006.01)
*H01F 27/24* (2006.01)
*H01F 27/28* (2006.01)

(52) U.S. Cl.
CPC ......... *H01F 27/2823* (2013.01); *H01F 27/24* (2013.01); *H01F 27/29* (2013.01)

(58) Field of Classification Search
CPC ...... H01F 27/2823; H01F 27/24; H01F 27/29; H01F 27/292; H01F 17/045; H01F 27/2828
See application file for complete search history.

(56) References Cited

U.S. PATENT DOCUMENTS 5,896,654 A 4/1999 Moll et al.
2006/0071749 A1 4/2006 Aoki et al.
(Continued)

FOREIGN PATENT DOCUMENTS

JP H08-0509577 A 10/1996
JP 2000-036427 A 2/2000
(Continued)

OTHER PUBLICATIONS

Apr. 5, 2022 Office Action Issued in U.S. Appl. No. 16/577,286.
Aug. 29, 2022 Notice of Allowance Issued in U.S. Appl. No. 16/577,286.

*Primary Examiner* — Mang Tin Bik Lian
(74) *Attorney, Agent, or Firm* — Oliff PLC

(57) ABSTRACT

To provide a coil device having high bonding strength and bonding reliability.

The coil device 1 has a core member 10 having a winding core and a flange 12, a wire 32 wound around the winding core, and a terminal electrode 52 connected with a lead **32*a* of a wire 32 provided to the flange 12; and an easy bonding layer 70 is formed on the surface of the terminal electrode 52 connected with the lead 32*a* in a stripe form 70*a*. the stripe form each bonding layer 70*a* is formed as a laser mark 71. In the coil device 1, a residue of coating film 78 which may be generated when the lead 32*a* of the wire 32 is connected to the mounting part 65 of the terminal electrode 52** is removed by laser.

7 Claims, 8 Drawing Sheets

(56) References Cited

U.S. PATENT DOCUMENTS

| | | | | |
|---|---|---|---|---|
| 2012/0274437 | A1* | 11/2012 | Matsuura | H01F 27/255 336/221 |
| 2013/0154784 | A1* | 6/2013 | Hachiya | H01F 5/003 336/200 |
| 2015/0318105 | A1 | 11/2015 | Lee et al. | |
| 2016/0012962 | A1 | 1/2016 | Lee et al. | |
| 2016/0372255 | A1* | 12/2016 | Maki | H01F 41/041 |
| 2017/0194085 | A1 | 7/2017 | Takagi et al. | |
| 2017/0200548 | A1* | 7/2017 | Takagi | H01F 27/2828 |
| 2017/0365399 | A1 | 12/2017 | Kobayashi et al. | |
| 2018/0130593 | A1 | 5/2018 | Sukegawa et al. | |
| 2018/0158591 | A1* | 6/2018 | Kobayashi | H01F 27/2828 |
| 2018/0166202 | A1* | 6/2018 | Ishida | H01G 4/2325 |
| 2019/0055653 | A1* | 2/2019 | Ueda | H01F 27/29 |
| 2019/0228899 | A1* | 7/2019 | Maki | H01G 4/30 |

FOREIGN PATENT DOCUMENTS

| | | | |
|---|---|---|---|
| JP | 2017-126634 | A | 7/2017 |
| JP | 2018-078155 | A | 5/2018 |
| WO | 2017-187930 | A1 | 11/2017 |
| WO | 2018110368 | | 6/2018 |

* cited by examiner

COIL DEVICE, PULSE TRANSFORMER, AND ELECTRONIC COMPONENT

RELATED APPLICATIONS

This is a Continuation of U.S. patent application Ser. No. 16/577,286 filed Sep. 20, 2019, which claims the benefit of Japanese Patent Application No. 2018-190333, filed Oct. 5, 2018. The disclosure of the prior applications is hereby incorporated by reference herein in its entirety.

BACKGROUND OF THE INVENTION

The present invention relates to a coil device and an electronic component used for example as a pulse transformer.

As a coil device used as a pulse transformer and the like, a coil device shown in Patent document 1 is known. In this conventional coil device, an end part of a wire forming a coil is connected by thermocompression to a terminal electrode having a mounting face.

However, in the conventional coil device described in Patent document 1, part of a coating film covering the wire remained on the mounting face of the terminal electrode as a residue of coating film. As a result, when the coil device is mounted on a substrate, voids and the like are formed at a connecting member such as a solder and the like which connects the mounting face of the terminal electrode and the substrate. Cracks may be formed from the voids, and in some case a connection reliability may be compromised.

Also, due to the influence from heat when the wire is connected by thermocompression, Sn layer melts and diminishes while on the mounting face of the terminal electrode, as a result, adhesiveness between the terminal electrode and the connecting member such as solder and the like is deteriorated, and in some case a bonding strength may decrease. Such problem could occur in other electronic components other than the coil device having the terminal electrode connected with the lead wire.

Patent document 1: JP Patent Application Publication No. 2018-78155

BRIEF SUMMARY OF THE INVENTION

The present invention is attained in view of such circumstances, and the object is to provide a coil device, a pulse transformer, and an electronic component having high bonding strength and bonding reliability.

In order to attain the above object, the coil device according to the present invention has

- a core member having a winding core and a flange,
- a wire wound around the winding core,
- a terminal electrode provided to the flange and connected with a lead of the wire, in which an easy bonding layer is formed in a stripe form to a surface of the terminal electrode connected with the lead.

In the coil device according to the present invention, the easy bonding layer is formed in a stripe form on the surface of the terminal electrode connected with the lead of the wire. For example, the easy bonding layer is constituted by Sn layer and the like, and it is the outermost surface layer improving the adhesiveness between the connecting member such as a solder and the like. Therefore, when the coil device is mounted on the substrate, the adhesiveness between the terminal electrode and the connecting member such as a solder and the like is enhanced, and the bonding strength (adhesive strength) is improved.

The easy bonding layer of a stripe form is formed for example by irradiating laser to the surface of the terminal electrode connected with the lead of the wire. That is, preferably the easy bonding layer of a stripe form is on the surface of the terminal electrode as a laser mark. A residue of coating film generated when the lead of the wire is connected by thermocompression to the terminal electrode is almost completely removed by laser irradiation. Therefore, when the coil device is mounted on the substrate, voids and the like are barely formed to the connecting member such as a solder and the like connecting the mounting face of the terminal electrode and the substrate, and cracks are suppressed from forming, hence the connecting reliability improves.

A longitudinal direction of the stripe of the easy bonding layer may match a longitudinal direction of the lead. In this case, a main scanning direction of the laser matches the longitudinal direction of the lead, and a residue of coating film adhered along longitudinal direction of the lead is removed efficiently. Also, the easy bonding layer may be formed to both sides of the lead. In this case, a residue of coating film adhered along the both sides of the lead is removed efficiently.

A stripe pattern of an underlayer of the easy bonding layer may be exposed to the surface of the terminal electrode. The underlayer is a layer of Ni, Ag, or Cu. In this case, a residue of coating film formed when the lead of the wire is connected by thermocompression to the terminal electrode is almost completely removed.

Also, the coil device according to the second aspect of the present invention has

- a core member having a winding core and a flange,
- a wire wound around the winding core, and
- a terminal electrode provided to the flange and connected with a lead of the wire, in which
- a stripe form laser mark is formed to a surface of the terminal electrode connected with the lead.

In the coil device according to the second aspect of the present invention, the stripe form laser mark is formed on the surface of the terminal electrode connected with lead. That is, a residue of coating film generated when the lead of the wire is connected by thermocompression to the terminal electrode is almost completely removed by laser irradiation. Therefore, when the coil device is mounted on the substrate, voids and the like are barely formed to the connecting member such as a solder and the like connecting the mounting face of the terminal electrode and the substrate, and cracks are suppressed from forming, hence the connecting reliability improves.

Also, since the laser mark is formed in a stripe form, the easy bonding layer such as Sn layer on the outermost surface which was not removed by laser irradiation is left in a stripe form, and the adhesiveness with the connecting member such as a solder and the like is improved. Therefore, when the coil device is mounted on the substrate, the adhesiveness between the terminal electrode and the connecting member such as a solder and the like is enhanced, and the bonding strength (adhesive strength) is improved.

The terminal electrode may further have an installation part which is formed continuously with the mounting part. By fixing the installation part to the flange, the mounting part of the terminal electrode does not need to be fixed to the flange, and a heat and impact resistance of the coil device is improved after it has been mounted. Also, since the mounting part of the terminal electrode is not adhered and fixed to the flange, coplanarity of the mounting face of the coil device can be improved.

Preferably, an exposed surface exposing the outer circumference face of the flange is formed between the edge of the mounting part of the terminal electrode at the side closer to the winding core and the inner face of the flange at the side closer to the winding core. Further preferably, the exposed surface is chamfered. By constituting as such, an angle of the end of the wire contacting the edge of the wire connecting part at the side closer to the winding core can be enlarged, and damage to the end of the wire can be reduced.

One terminal electrode among plurality of terminal electrodes provided to the flange has a wide wire connecting part having wider width than the wire connecting part of other terminal electrodes of the flange. In the wide wire connecting part, ends of two or more wires may be connected by aligning along outer circumference direction of the flange.

A pulse transformer according to the present invention has any one of the coil device mentioned in the above.

Also, an electronic component according to the present invention has an element body having a lead extending towards outside, and a terminal electrode provided to an outer face of the element body, in which an easy bonding layer is formed in a stripe form to a surface of the terminal electrode connected with the lead. Alternatively, a stripe form laser mark is formed on the surface of the terminal electrode connected with the lead.

In the electronic component according to the present invention, the easy bonding layer is formed in a stripe form on the surface of the terminal electrode connected with the lead. The easy bonding layer of a stripe form is for example formed by irradiating laser to the surface of the terminal electrode connected with the lead of the wire. That is, preferably, the easy bonding layer of a stripe form is on the surface of the terminal electrode as a laser mark. A residue of coating film generated when the lead of the wire is connected by thermocompression to the terminal electrode is almost completely removed by laser irradiation. Therefore, when the coil device is mounted on the substrate, voids and the like are barely formed to the connecting member such as a solder and the like connecting the mounting face of the terminal electrode and the substrate, and cracks are suppressed from forming, hence the connecting reliability improves.

Also, since the laser mark is formed in a stripe form, the easy bonding layer such as Sn layer on the outermost surface which was not removed by laser remains in a stripe form, hence the adhesiveness with the connecting member such as a solder and the like improves. Therefore, when the coil device is mounted on the substrate, the adhesiveness between the terminal electrode and the connecting member such as a solder and the like is enhanced, and the bonding strength (adhesive strength) is improved.

BRIEF DESCRIPTION OF DRAWINGS

FIG. 2A shows a lead of a wire provided to a terminal electrode.

FIG. 2B shows the wire connected to the terminal electrode by thermocompression.

FIG. 2C shows laser being irradiated to the terminal electrode connected with the wire by thermocompression.

FIG. 2D shows the underlayer is not exposed to the outermost surface.

DETAILED DESCRIPTION OF THE INVENTION

Hereinafter, the present invention is described based on embodiments shown in the figures.

Figure 1:
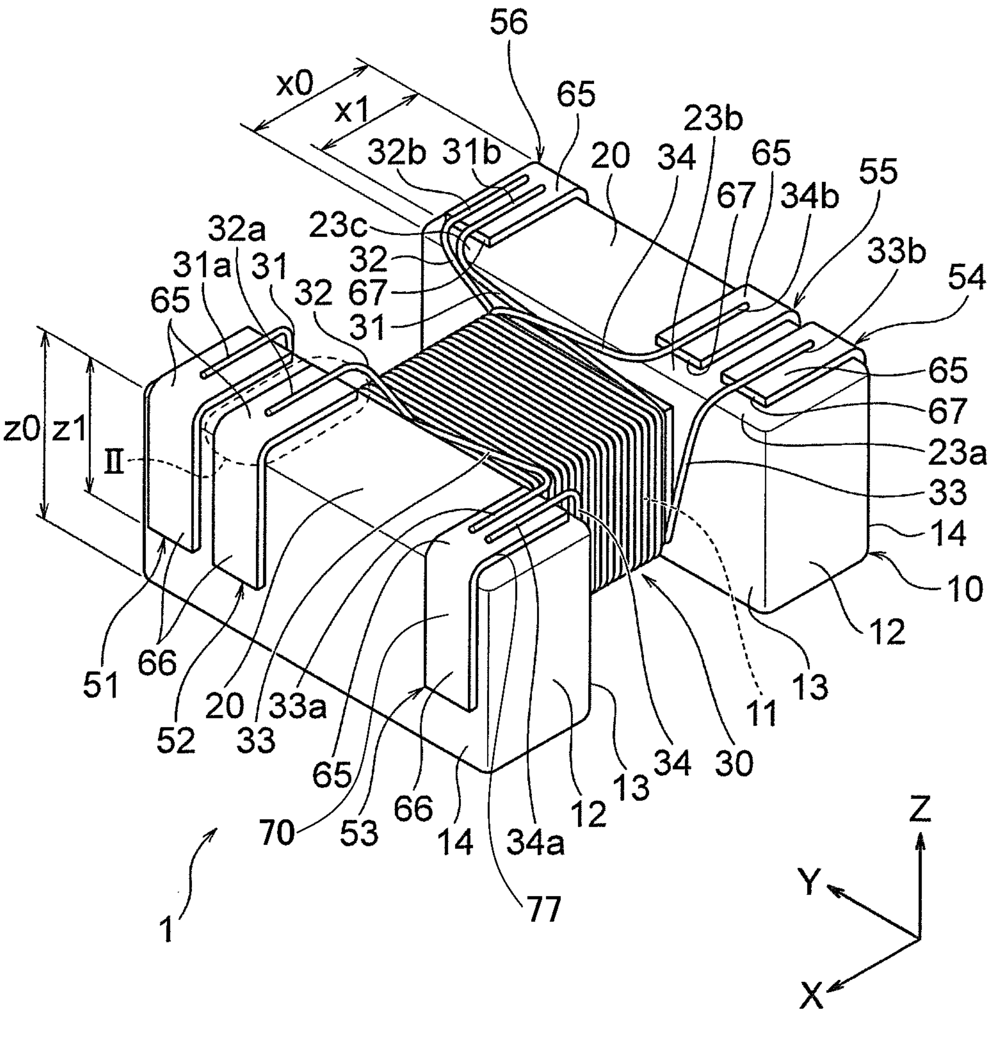
FIG. 1 is a perspective diagram of a coil device according to one embodiment of the present invention.

As shown in FIG. 1, the coil device 1 is a coil component of a surface mounting type used for example as a pulse transformer. The coil device 1 has a drum core 10 as a core member of a drum shape, a coil part 30, and terminal electrodes 51 to 56.

In the coil device 1, an upper face in Z axis direction of FIG. 1 is a mounting face when the coil device 1 is mounted on a substrate and the like. Note that, in below description, an axis parallel to a coil axis of the coil part 30 of the coil device 1 is defined as X-axis, an axis parallel to a height direction of the coil device 1 is defined as Z-axis, and an axis approximately perpendicular to X-axis and Z-axis is defined as Y-axis.

An external dimension of the coil device 1 is not particularly limited, and for example it may be X-axis length of 2.0 to 6.0 mm, Y-axis width of 2.0 to 6.0 mm, and Z-axis height of 1.0 to 4.0 mm.

The drum core 10 has a winding core 11 to which the coil part 30 is wound around (a rod shape portion positioned inside the coil part 30 in FIG. 1), and a pair of flanges 12, 12 provided to both ends of the winding core 11 in X-axis direction. A cross section shape of the winding core 11 is approximately square shape in the present embodiment, but it is not particularly limited and it may be other polygonal shape, a circular shape, or an oval shape. As shown in FIG. 1, the outer shape of the two flanges 12, 12 are both approximately rectangular parallelepiped shape, but these may have different shape and size against each other.

The drum core 10 is constituted by a magnetic member, and for example a magnetic material having a relatively high magnetic permeability such as Ni—Zn based ferrite, Mn—Zn based ferrite, or magnetic powder including metal magnetic material and the like.

Two flanges 12, 12 are provided so that these are approximately parallel to each other and predetermined space in X-axis direction is provided between the two flanges 12, 12. Both ends of the winding core 11 in X-axis direction are connected to a center part in Y-axis direction of an inner faces 13, 13 of opposing pair of flanges 12, 12. A mounting surface 20 of the flange 12 is constituted by a flat and smooth surface.

Regarding the flanges 12, 12, first to third terminal electrodes 51 to 53 are formed to the mounting face 20 of one flange 12; and fourth to sixth terminal electrodes 54 to 56 are formed to the mounting face 20 of other flange 12.

The coil part 30 is formed to the winding core 11 of the drum core 10. In the present embodiment, the coil part 30 is constituted by four wires 31 to 34 which are wound around the winding core 11. The first wire 31 and the second wire 32 constitute a primary coil as a pulse transformer, and the third wire 33 and the fourth wire 34 constitute a secondary coil. The first wire 31 and the second wire 32 forming the primary coil are wound around in opposite direction, and the third wire 33 and the fourth wire 34 forming the secondary coil are wound around in opposite direction.

Each end 31*a* to 34*a* and 31*b* to 34*b* of four wires 31 to 34 wound around in such manner is connected to the respective terminal electrodes 51 to 56 provided to the flanges 12, 12 of the drum core 10 by thermocompression.

Specifically, one end 31*a* of the first wire 31 is connected to the first terminal electrode 51, one end 32*a* of the second wire 32 is connected to the second terminal electrode 52, and ends 33*a* and 34*a* of the third wire 33 and the fourth wire 34 are both connected to the third terminal electrode 53.

Also, the other ends 31*b* and 32*b* of the first wire 31 and the second wire 32 are both connected to the sixth terminal electrode 56, and the other end 33*b* of the third wire 33 is connected to the fifth terminal electrode 55, and the other end 34*b* of the fourth terminal electrode 34 is connected to the fourth terminal electrode 54.

The wires 31 to 34 are wound around in such manner, and connected to the terminal electrodes 51 to 56. Thereby, the first terminal electrode 51 and the second terminal electrode 52 form a primary coil terminal electrode (input terminal); and the fourth terminal electrode 54 and the fifth terminal electrode 55 form the secondary coil terminal (output terminal). Also, the third terminal electrode 53 and the sixth terminal electrode 56 respectively form a center tap of the primary coil (input) and the secondary coil (output).

Regarding the terminal electrodes 51 to 56, as shown in FIG. 1, the exposed surfaces 23*a* to 23*c* exposing the outer circumference face of the flange 12 are formed between the edge 67 of each terminal electrode 51 to 56 at the side closer to the winding core 11 and the inner face 13 of the flange 12 at the side of the winding core 11. The exposed surfaces 23*a* to 23*c* are chamfered. By constituting as such, the ends of the wires 31 to 34 can contact in a larger angle with the edge 67 of the mounting part 65 at a side closer to the winding core 11, thereby damages to the lead ends (leads) of the wires 31 to 34 can be reduced.

Each wire 31 to 34 is constituted by a coated conductive wire, and for example a core material made of a conductor having high conductivity such as copper (Cu) and the like is coated with an insulating material made of imide-modified polyurethane and the like, and the outermost surface is further coated with a thin film of resin such as polyester and the like. Note that, the core material and the coating material of the wires 31 to 34 are not limited thereto.

Also, a wire size, a number of winding, a method of winding a wire, and a number of layers of wire wound around the coil part 30 of each wire 31 to 34 may be determined per each wire depending on demanded properties of the coil device 1. In the present embodiment, the wires 31 to 34 have the same wire size and are wound for the same number of times, and the wires are wound by forming a pair of wires 31 and 34 (or 32 and 34) which are wound around in the same direction, and for example four wires are wound around to form two layers.

The terminal electrodes 51 to 56 are respectively formed by bending the terminal member of a metal board. The terminal member is a metal for example copper, copper alloy, and the like, or it is constituted by other conductive board.

In the present embodiment, the terminal electrodes 51 to 56 have the same size and shape, and each of them has the mounting 65 part and the installation part 66. Note that, the mounting part 65 provided respectively to the terminal electrodes 53 and 56 where ends of two wires are connected may have wider width in Y-axis direction compared to the mounting part 65 of other terminal electrodes 51, 52, 54, and 55.

The installation part 66 is formed continuously by bending one side in X-axis direction of the mounting part 65 down along Z-axis direction from the end of the mounting part 65.

A height z1 in Z-axis direction of the installation part 66 is preferably shorter than or equal to a height z0 in Z-axis direction of the flange 12; and z1/z0 is preferably 0.2 to 1. In the present embodiment, the width in Y-axis direction of the installation part 66 is equal to the width of an axis direction of the mounting part 65, but it may be larger or smaller than the width of an axis direction of the mounting part 65.

The X-axis direction length x1 of the mounting part 65 is determined in relation with the width x0 in X-axis direction of the flange 12 of the drum core 10. That is, the X-axis direction length x1 of the mounting part 65 is determined so that the exposed surfaces 23*a* to 23*c* exposing portion of the mounting face 20 (portion of the outer circumference face of the flange 12) are formed between the edge 67 of the mounting part 65 of the terminal electrode at the side closer to the winding core and the inner face 13 of the flange 12 at the side closer to the winding core.

Therefore, the X-axis direction x1 of the mounting part 65 is preferably equal to or less than the X-axis direction x0 of the mounting face 20 of the flange 12 of the drum core 10; and x1/x0 is preferably 1/3 to 10/10 and more preferably 7/10 to 9.5/10. A thickness of the terminal member constituting each terminal electrode 51 to 56 is not particularly limited, and preferably it is 50 to 100 μm. The installation part 66 of the terminal member constituting each terminal electrode 51 to 56 is bonded to the outer surface 14 of the flange 12 by means of adhesion and the like.

The mounting part 65 of the terminal member is preferably provided in a movable manner and not adhered to the mounting face 20 which is an upper face of the flange 12 in Z-axis direction. Since the mounting part 65 is not adhered or fixed to the mounting face 20 of the flange 12, coplanarity of the mounting face of the coil device 1 can be improved. Also, the coil device 1 can have improved resistance against strain or vibration of the substrate when the coil device 1 is mounted on the substrate and the like, thus a mounting reliability can be improved.

In the present embodiment, the mounting part 65 is provided by closely contacting on the mounting face 20. The ends 31*a* to 34*a* and 32*b* to 34*b* of the wires 31 to 34 are connected by thermocompression to the mounting part 65 in later step, thus the mounting part 65 is preferably closely contacting the mounting face 20, but it does not necessarily have to be adhered and some degree of space may be formed. By having the space between the mounting part 65 and the mounting face 20, the mounting part 65 can be resiliently deformed and the heat and impact resistance and the like can be improved even after the coil device 1 is mounted on the substrate and the like. Also, by having the space, coplanarity of the mounting face of the coil device 1 can be further improved.

Figure 2A:
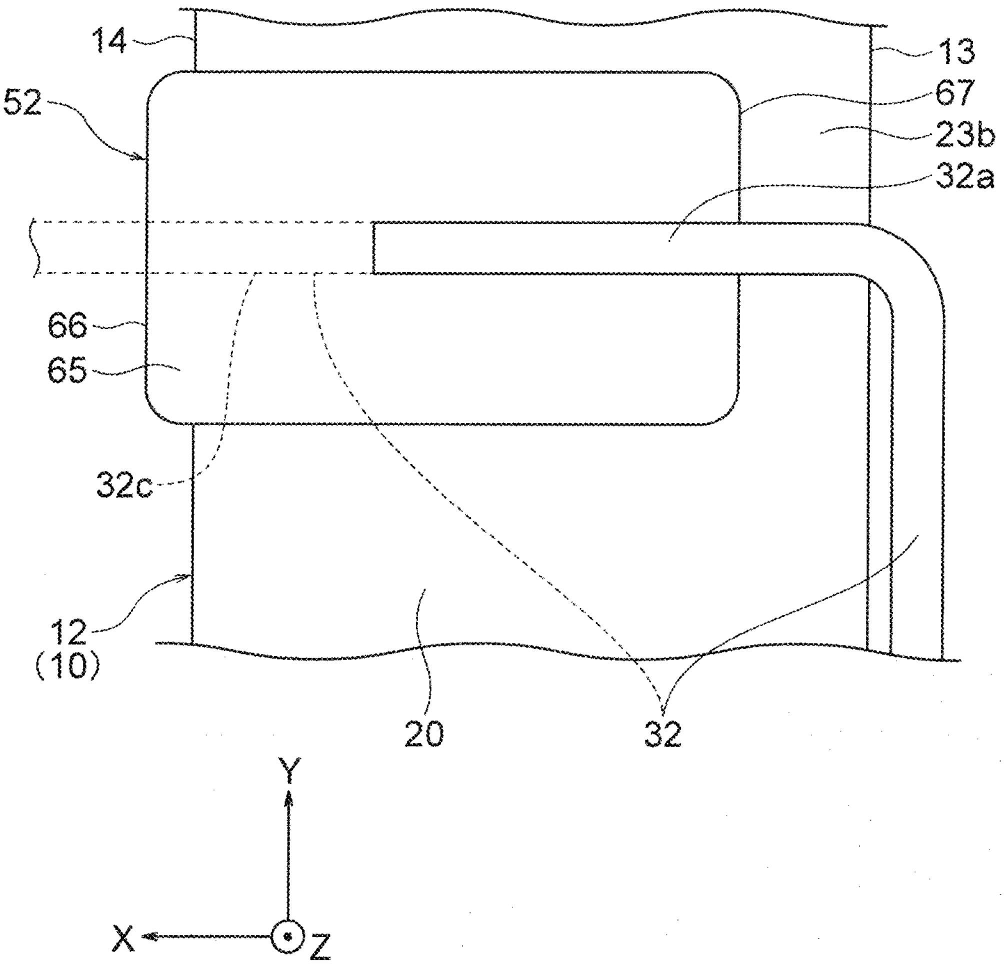
FIG. 2A is a partial planar diagram of an area indicated “II” in FIG. 1
Figure 2B:
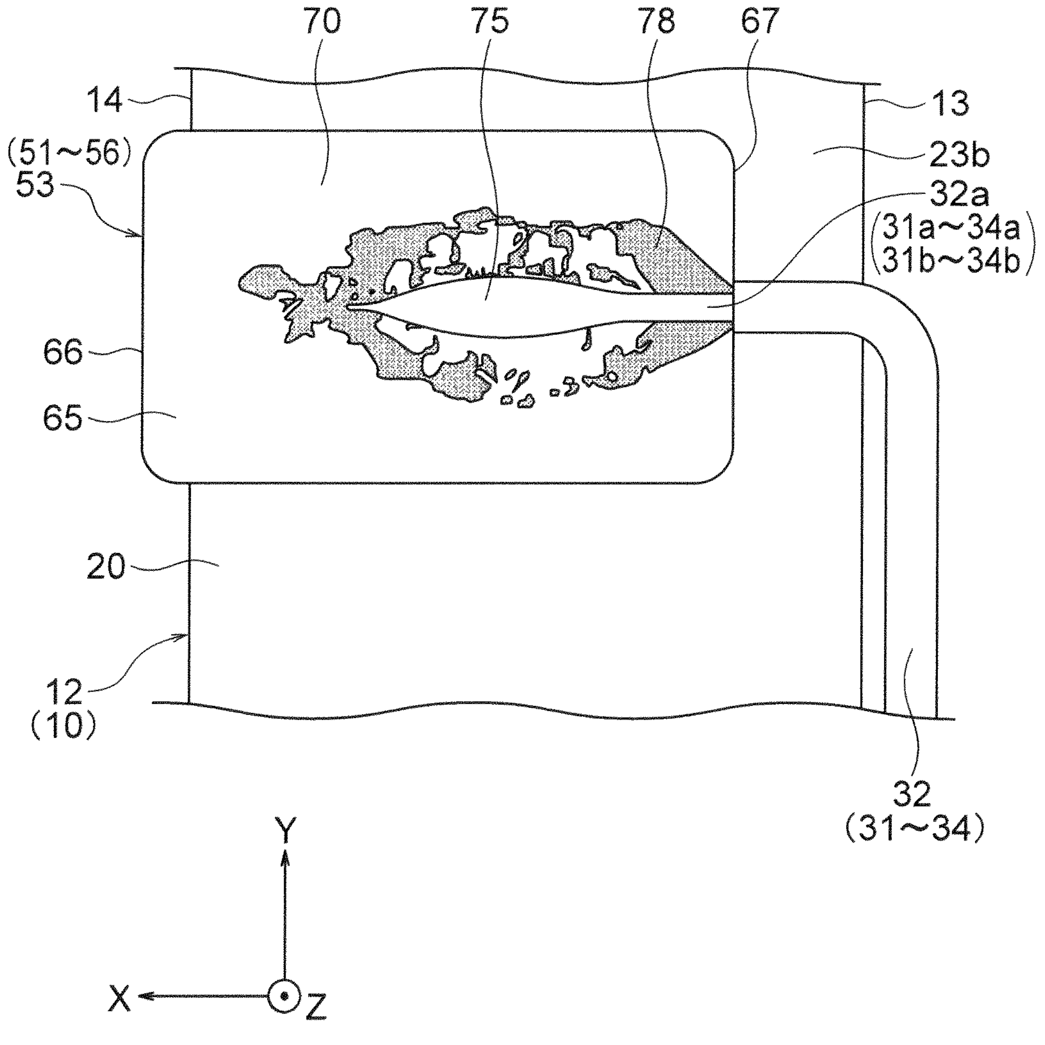
FIG. 2B is a partial planar diagram of an area indicated “II” in FIG. 1
Figure 2C:
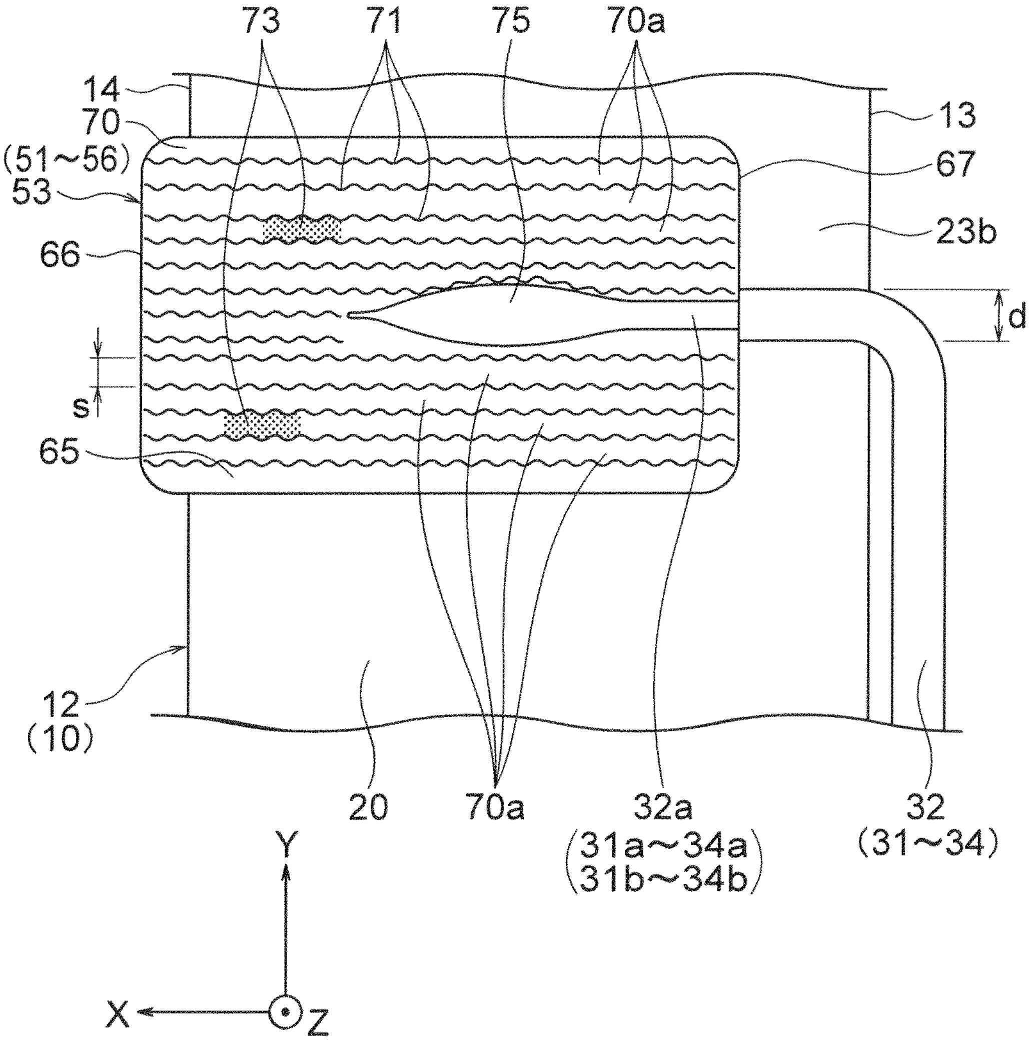
FIG. 2C is a partial planar diagram of an area indicated “II” in FIG. 1
Figure 2D:
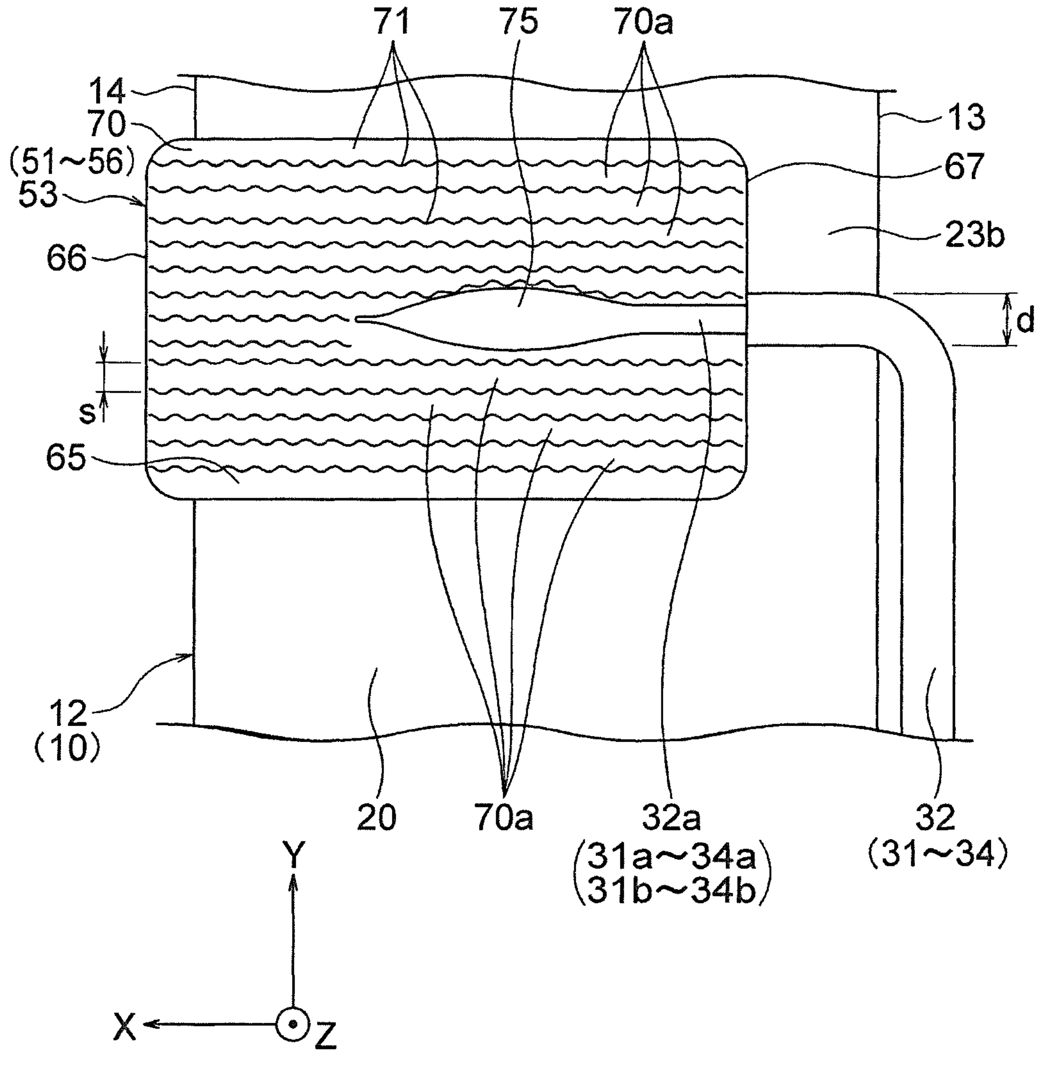
FIG. 2D is a partial planar diagram of an area indicated “II” in FIG. 1

As shown in FIG. 2C, in the present embodiment, at the surface of the mounting part 65 of each terminal electrode 51 to 56 bonded with any one of the leads (ends) 31*a* to 34*a* and 31*b* to 34*b* of the wires 31 to 34 by thermocompression, a core wire exposed part 75 is exposed where the core wire material of the wires 31 to 34 are exposed. Also, at the surface of the mounting part 65 of each terminal electrode 51 to 56, a stripe form laser mark 71 is formed. Due to the stripe form laser mark 71, the outermost surface layer 70 of the terminal electrode 52 is exposed in a stripe form, thus a stripe form Sn layer (easy bonding layer) 70*a* is formed on the surface of the mounting part 65.

In the present embodiment, on the surface of the mounting part 65 of each terminal electrode 51 to 56, the longitudinal direction of a stripe of Sn layer 70*a* as the easy bonding layer and the longitudinal direction (X-axis direction) of the leads 31*a* to 34*a* and 31*b* to 34*b* matches. Also, at the surface of the mounting part 65 of each terminal electrode 51 to 56, Sn layer 70*a* of stripe form is formed to both sides of the leads 31*a* to 34*a* and 31*b* to 34*b* in Y-axis direction. Also, at the surface of the mounting part 65 of each terminal electrode 51 to 56, a stripe pattern of the underlayer 73 of Sn layer 70*a* may be exposed. The underlayer is for example a layer of Ni, Ag, or Cu.

Pitch s of the layer mark in Y-axis direction (corresponds to scanning pitch of laser beam) is preferably determined in relation with a wire size d of each wire 31 to 34; and in the present embodiment, s/d is 1/10 to 3/1 and preferably 1/3 to 1/1. The wire size d of the wires 31 to 34 is preferably 30 to 80 μm.

When producing the coil device 1 having such constitution, first the terminal electrodes 51 to 56 are provided to the drum core 10. Each terminal electrode 51 to 56 has the mounting part 65 corresponding to the terminal member on the mounting face 20; and the installation part 66 is adhered to the outer face 14 of the flange 12; thereby each terminal electrode 51 to 56 is formed.

Note that, a method of forming the terminal electrodes 51 to 56 is not limited to a method of installing the terminal member, and the terminal electrodes 51 to 56 may be formed by a baking process, a plating process, and the like of a printed or coated conductive film. Even by such method, the terminal electrode similar to the present embodiment can be formed to the mounting face 20 and also the exposed surfaces 23*a* to 23*c* can be formed to the mounting face 20.

After the terminal electrodes 51 to 53 and 54 to 56 are respectively mounted to the flange of the drum core 10, then the drum core 10 is set to a winding machine, and the wires 31 to 34 are wound around the winding core 11 of the drum core 10 in a predetermined order.

When the wires are wound around the drum core, the ends 31*a* to 34*a* and 31*b* to 34*b* of the wires 31 to 34 are fixed by thermocompressing to the mounting part 65 of each terminal electrode 51 to 56. For example, in order to connect the ends 32*a* of the second wire 32 to the mounting part 65 of the second terminal electrode 52, as shown in FIG. 2A, while the wire 32 is stretched from the winding machine not shown in the figure and then placed on the mounting part 65 of the second terminal electrode 52, a heater not shown in the figure is pressed over the wire 32 and the mounting part 65, then heated.

By carrying out the thermocompression, the coating material of the wire 32 is melted or removed, and the core material of the wire 32 as the conductor is exposed, then the wire 32 is electrically connected to the mounting part 65 of the terminal electrode 52 by thermocompression.

At the flange 12 provided with three terminal electrodes 51 to 53 or 54 to 56, the wires may be connected by thermocompression using one wide heater to one flange 12; or the four wires 31 to 34 may be connected by thermocompression using a single heater and by changing the position of thermocompression.

Also, by using one wide heater, the ends of wires 32 and 34 which are wound in the same direction can be connected by thermocompression at a same time. Therefore, in the coil device 1, a step of connecting the ends 31*a* to 34*a* and 31*b* to 34*b* of the wires 31 to 34 by thermocompression to the terminal electrodes 51 to 56 can be done easily, and also the production machine can be simplified.

After both ends 31*a* to 34*a* and 31*b* to 34*b* of the wires 31 to 34 are heat compressed to the terminal electrodes 51 to 56, unnecessary portions of the ends 31*a* to 34*a* and 31*b* to 34*b* are cut off. For example, in the second wire compressed and connected to the second terminal electrode 52, as shown in FIG. 2A, the unnecessary portion 32*c* which is a portion (the end 32*a*) in front of the wire 32 being connected by thermocompression is cut and removed by lowering down a wire cutter not shown in the figure.

After both ends 31*a* to 34*a* and 31*b* to 34*b* of the wires 31 to 34 (shown in FIG. 1) are connected to the terminal electrodes 51 to 56 by thermocompression and the unnecessary portions are cut off, then a surface treatment by laser is carried out to the terminal electrodes 51 to 56.

At the surface of the terminal electrodes 51 to 56 connected with the ends (leads) 31*a* to 34*a* and 31*b* to 34*b* of the wires 31 to 34, for example as shown in FIG. 2B regarding the second terminal electrode 52 connected with the second wire 32, a residue of coating film 78 made of an insulating resin (such as polyurethane and the like) which is used as a coating film material (insulating material) of the wire 32 is remained. The outermost surface layer 70 of the terminal electrode 52 is not exposed at an area where the residue of coating film 78 remained. The outermost surface layer 70 is a layer made of material improving the adhesiveness with the connecting member such as a solder and the like, that is, the outermost surface layer is the easy bonding layer. Specifically, for example, the outermost surface layer is Sn layer having an excellent adhesiveness with a solder, but the present embodiment is not limited to Sn layer.

In FIG. 2B, a core wire exposed part 75 is formed at a position of the lead 32*a* of the wire 32 of the mounting part 65 of the second terminal electrode 52. The core wire exposed part 75 is a part where the coating material of the wire 32 melted and removed, and the core material (in the present embodiment, it is Cu) of the wire as a conductor has exposed.

Laser irradiation is performed to the surface of the terminal electrode 52 (51 to 56) as shown in FIG. 2B to remove a residue of coating film 78, thereby Sn layer as the outermost surface layer of the terminal electrode 52 is exposed.

A surface treatment by laser is performed by scanning a laser beam along the longitudinal direction (X-axis direction) of the lead 32*a* of the wire 32 in a predetermined pitch. Note that, the scanning direction of the laser beam (main scanning direction) may be perpendicular or diagonal to the longitudinal direction of the lead 32*a* of the wire 32; but preferably it is along the longitudinal direction (X-axis direction) of the wire 32.

As a result of the surface treatment by laser beam to the surface of the terminal electrode 51 to 56 (see FIG. 1), for example as shown in FIG. 2C of the terminal electrode 52 connected with the second wire 32, a residue of coating film

78 is almost completely removed, and a stripe form laser mark 71 is formed on the surface of the terminal electrode 52. Due to this laser mark 71, the outermost surface layer 70 of the terminal electrode 52 is exposed in a stripe form, hence a stripe form Sn layer 70*a* is formed.

As such, due to the surface treatment of the terminal electrodes 51 to 56 (see FIG. 1) by laser beam, the easy bonding layer 70*a* is formed in a stripe form to the terminal electrodes 51 to 56. In other words, at the surface of the terminal electrodes 51 to 56, as shown in FIG. 2C, the easy bonding layer 70*a* is formed as a laser mark 71. As a result, after the surface treatment is performed, carbon (C) is barely detected which is a main residual component of the residue of coating film 78 at the surface of the terminal electrodes 51 to 56.

Also, as shown in FIG. 2C, the underlayer 73 of a stripe form (a stripe pattern of underlayer) may be exposed/formed to part of the surface of the terminal electrodes 51 to 56. The underlayer 73 is formed by a plating and the like between the outermost surface layer 70 (Sn layer) of each terminal electrode 51 to 56 and the substrate of each terminal electrode 51 to 56; and it is a layer of Ag, Ni, Cu, or the like.

As such, the lead 32*a* is provided at approximately center of the mounting part 65 in Y-axis direction as shown in FIG. 2A and connected to the terminal electrodes 51 to 56 by thermocompression. Then, as shown in FIG. 2C, a surface treatment by laser beam is performed to entire surface of the mounting part 65 (including the core wire exposed part 75), thereby the stripe form easy bonding layer 70*a* is formed at both sides in Y-axis direction of the core wire exposed part 75.

Type and intensity of laser (wavelength, peak intensity, pulse width, and the like) is determined to a level which enables to remove the residue of coating film 78, and preferably it is weak enough so that the Sn layer 70 of the surface of the terminal electrodes 51 to 56 is left in a stripe form.

Figure 3A:
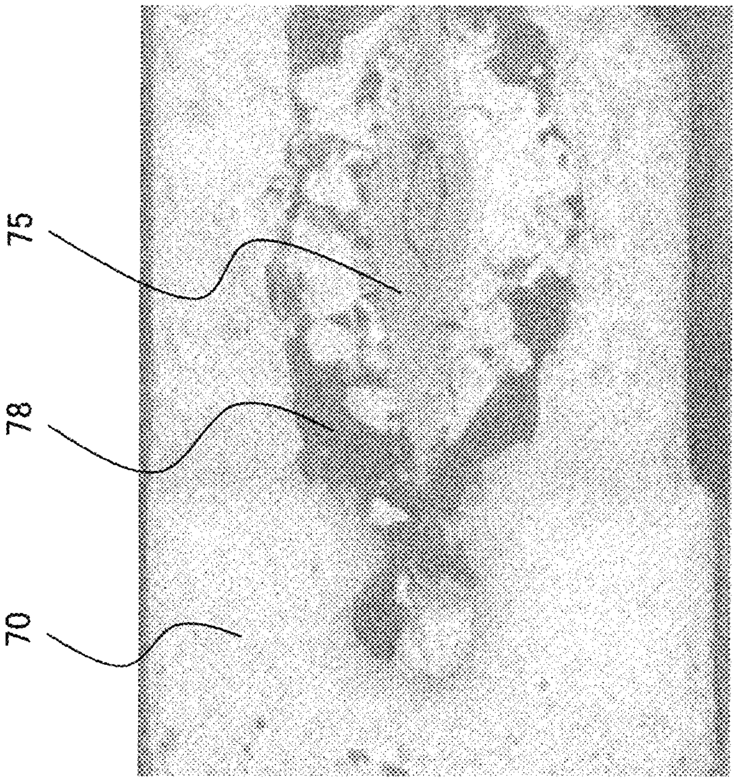
FIG. 3A corresponds to FIG. 2B, and it is a photograph showing the terminal electrode connected with the wire by thermocompression.

FIG. 3A corresponds to FIG. 2B, and it is a photograph showing the wire connected to the terminal member constituting each terminal electrode 51 to 56 by thermocompression. As shown in FIG. 3A, after the lead of the wire is connected to the terminal member by thermocompression, the residue of coating film 78 of the coating material (insulating material) of the wire is left around the core wire exposed part 75 where the core material of wire is exposed, and the Sn layer 70 as the outermost surface layer of the terminal member is covered.

Figure 3B:
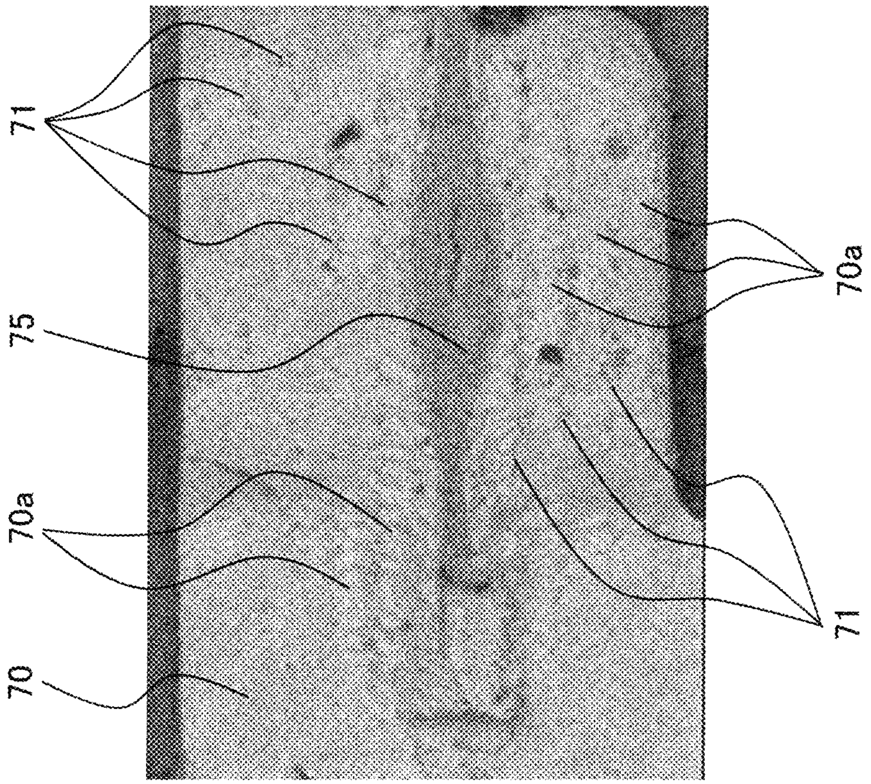
FIG. 3B corresponds to FIG. 2C, and it is a photograph showing laser irradiation to the terminal electrode connected with the wire by thermocompression.
Figure 4:
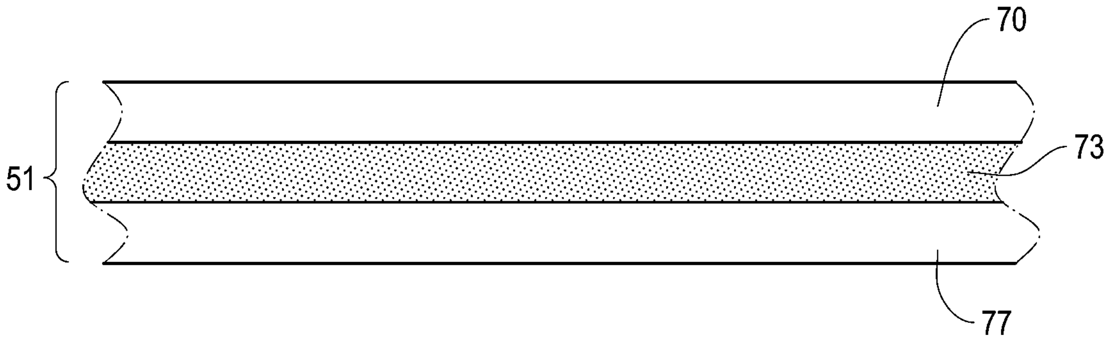
FIG. 4 is schematic diagram of terminal electrode with a substrate, an underlayer and at least one layer above the underlayer.

FIG. 3B corresponds to FIG. 2C, and it is a photograph showing the surface of the terminal member after the wire is connected by thermocompression (FIG. 3A) is finished with the surface treatment by laser. As shown in FIG. 3B, the residue of coating film 78 is almost completely removed from the surface of the terminal member and the stripe form laser mark 71 is formed. In FIG. 3B, a stripe form Sn layer 70*a* due to this laser mark 71 is formed. The stripe form Sn layer 70*a* can be observed by analyzing the surface of the terminal electrode using an electron microscope and the like. Also, a stripe pattern of the underlayer 73 can be observed by the same method. Also, the same method can be used to observe that carbon (residue of coating film) does not exist on the surface of the terminal electrode.

In the coil device 1 of the present embodiment, as shown in FIG. 2C, the stripe form easy bonding layer 70*a* is formed on the surface of the terminal electrode 52 (51 to 56) connected with the lead 32*a* (31*a* to 34*a* and 31*b* to 34*b*) of the wire 32 (31 to 34). Thus, when the coil device 1 (shown in FIG. 1) is mounted on the circuit board (not shown in the figure), the adhesiveness between the connecting member such as solder and the like connecting the substrate and the mounting part 65 of the terminal electrodes 51 to 56 is enhanced, thus the connecting strength (adhesive strength) is improved.

Also, the surface of the mounting part 65 of each terminal electrode 51 to 56 which has been connected with the leads 31*a* to 34*a* and 31*b* to 34*b* is surface treated by laser. Therefore, as shown in FIG. 2C, the stripe form easy bonding layer 70*a* appears on the surface of the mounting part 65 of the terminal electrode 52 (51 to 56) together with the laser mark 71. Therefore, the residue of coating film 78 formed when connecting the leads 32*a* (31*a* to 34*a* and 31*b* to 34*b*) of the wire 32 (31 to 34) by thermocompression is almost completely removed by laser. As a result, when the coil device 1 is mounted on the circuit board and the like, voids are unlikely to be generated in the connecting member such as a solder and the like connecting the substrate and the mounting part 65 of each terminal electrode 51 to 56. Thus, cracks are suppressed from forming and the connecting reliability is improved.

Also, in the coil device of the present embodiment, as shown in FIG. 2C, the longitudinal direction of the stripe of the Sn layer 70*a* as the easy bonding layer matches with the longitudinal direction of the lead 32*a* (31*a* to 34*a* and 31*b* to 34*b*). That is, the main scanning direction of the laser matches with the longitudinal direction of the lead 32*a* (31*a* to 34*a* and 31*b* to 34*b*) and a residue of coating film adhered along the longitudinal direction of lead 32*a* (31*a* to 34*a* and 31*b* to 34*b*) is efficiently removed. Also, the Sn layer 70*a* as the easy bonding layer is formed on both sides of the lead 32*a* in Y-axis direction. Therefore, a residue of coating film adhered along both sides of lead 32*a* (31*a* to 34*a* and 31*b* to 34*b*) in Y-axis direction is efficiently removed.

Also, in the coil device 1 of the present embodiment, the exposed surfaces 23*a* to 23*c* exposing the outer circumference face of the flange 12 are formed between the edge 67 of the mounting part 65 of each terminal electrode 51 to 56 at the side closer to the winding core 11 and the inner face 13 of the flange 12 at the side of the winding core 11. The exposed surfaces 23*a* to 23*c* are chamfered. By constituting as such, the ends of the wires 31 to 34 can contact in a larger angle with the edge 67 of the mounting part 65 at a side closer to the winding core 11, thereby damages to the lead ends (leads) of the wires 31 to 34 can be reduced.

Note that, the present invention is not limited to the above mentioned embodiment and various modifications can be done within the scope of the present invention.

In the above mentioned embodiment, a board shaped core which magnetically connect a pair of flanges 12, 12 is not provided to an opposite face of the mounting face 20 of the pair of flanges 12, 12; however, a board shaped core may be bonded by adhesion and the like.

Also, in the above mentioned embodiment, the third terminal electrode 53 and the sixth terminal electrode 56 are formed as a center tap for input and output respectively, but the center tap may be omitted depending on use. In such case, the third terminal electrode 53 and the sixth terminal electrode 56 are not needed and the coil device (pulse transformer) can be constituted by two wires. Further, in the above mentioned embodiment, the terminal electrodes 51 to 56 are installed as a separate metal board member to the flange 12, but these may be directly formed to the outer surface of the flange by a method of baking, plating, deposition and the like of an electrode paste.

Also, in the above mentioned embodiment, the present invention is described as preferable device as a pulse transformer which is used to transfer pulse signal via LAN cable and the like, but the use of the present invention is not limited thereto. For example, the present invention can be used as other coil device such as common mode filter and the like, and also the present invention can be used as any type of electronic component which connects leads of wire to the terminal electrode by thermocompression or method other than thermocompression.

NUMERICAL REFERENCES

1 . . . Coil device
10 . . . Drum core (Core member)
11 . . . Winding core
12 . . . Flange
13 . . . Inner face
14 . . . Outer face
20 . . . Mounting face
23*a* to 23*c* . . . Exposed surface
30 . . . Coil member
31 to 34 . . . Wire
31*a* to 34*a*, 31*b* to 34*b* . . . End (lead)
32*c* . . . Unnecessary portion
51 to 56 . . . Terminal electrode
65 . . . Mounting part
66 . . . Installation part
67 . . . Edge of wire connecting part
70 . . . Outermost surface (Sn layer)
70*a* . . . Stripe form Sn layer
71 . . . Laser mark
73 . . . Underlayer
75 . . . Core wire exposed part
78 . . . Residue of coating film

What is claimed is:

1. A coil device comprising:
a core member having a winding core and a flange;
a wire wound around the winding core; and
a terminal electrode provided to the flange and connected with a lead of the wire, wherein
the terminal electrode is a preformed metal board member,
an easy bonding layer is formed in a stripe form to a surface of the terminal electrode connected with the lead,
the terminal electrode includes, in order, a substrate, an underlayer and at least one layer above the underlayer,
the easy bonding layer is formed in an outermost layer included in the at least one layer above the underlayer of the terminal electrode, and
the underlayer is not exposed to an outermost surface of the terminal electrode.

2. The coil device according to claim 1, wherein the easy bonding layer of the stripe form is on the surface of the terminal electrode as a laser mark.

3. The coil device according to claim 1, wherein a longitudinal direction of the easy bonding layer of the stripe form matches with a longitudinal direction of the lead.

4. The coil device according to claim 3, wherein the easy bonding layer is formed to both sides of the lead.

5. A pulse transformer having a coil device according to claim 1.

6. A coil device comprising:
a core member having a winding core and a flange;
a wire wound around the winding core; and
a terminal electrode provided to the flange and connected with a lead of the wire, wherein
the terminal electrodes is directly formed to a flat and smooth outer surface of the flange,
a stripe form laser mark is formed to a surface of the terminal electrode connected with the lead,
the terminal electrode includes, in order, a substrate, an underlayer and at least one layer above the underlayer,
the stripe form laser mark is formed in an outermost layer included in the at least one layer above the underlayer of the terminal electrode, and
the underlayer is not exposed to an outermost surface of the terminal electrode.

7. An electronic component comprising:
an element body having a lead extending towards outside; and
a terminal electrode provided to an outer face of the element body, wherein
the terminal electrode is a preformed metal board member,
an easy bonding layer is formed in a stripe form to a surface of the terminal electrode connected with the lead,
the terminal electrode includes, in order, a substrate, an underlayer and at least one layer above the underlayer,
the easy bonding layer is formed in an outermost layer included in the at least one layer above the underlayer of the terminal electrode, and
the underlayer is not exposed to an outermost surface of the terminal electrode.

* * * * *